United States Patent [19]

West

[11] Patent Number: 4,471,252
[45] Date of Patent: Sep. 11, 1984

[54] ROTARY DYNAMO ELECTRIC MACHINE WITH PROTECTION AGAINST DEMAGNETIZATION OF LOW FLUX PORTION OF PERMANENT MAGNET POLES

[75] Inventor: John G. W. West, Pershore, England

[73] Assignee: Lucas Industries Limited Company, Birmingham, England

[21] Appl. No.: 443,521

[22] Filed: Nov. 22, 1982

[30] Foreign Application Priority Data

Nov. 27, 1981 [GB] United Kingdom ............... 8135844

[51] Int. Cl.³ ............................................. H02K 1/18
[52] U.S. Cl. .................................... 310/154; 310/254; 335/296
[58] Field of Search .............. 310/41, 42, 68 R, 154, 310/156, 152, 177, 181, 182, 186, 190–192, 254, 167, 153; 335/296

[56] References Cited

U.S. PATENT DOCUMENTS

| 3,277,324 | 10/1966 | Beaudoin et al. | 310/254 |
| 4,110,718 | 8/1978 | Odor et al. | 335/296 |
| 4,237,397 | 12/1980 | Mohr et al. | 310/154 |

FOREIGN PATENT DOCUMENTS

| 2550416 | 5/1977 | Fed. Rep. of Germany | 310/154 |
| 2813701 | 10/1978 | Fed. Rep. of Germany | 310/154 |

Primary Examiner—J. D. Miller
Assistant Examiner—D. L. Rebsch
Attorney, Agent, or Firm—Holman & Stern

[57] ABSTRACT

A permanent magnet dynamo electric machine is provided with a shield of high saturation flux density at the weaker or lower flux tip or edge of a permanent magnet pole face to prevent both circumferential and axial demagnetization of that portion of the pole face. The shield resides in a recess in the pole face so as to maintain a constant width air gap between the rotor and stator and has a thickness in the range of 5–15% of the overall thickness of the shield and pole combined. The shield and its pole face extend axially at least over the entire axial dimension of the area swept by the rotor.

23 Claims, 12 Drawing Figures

ROTARY DYNAMO ELECTRIC MACHINE WITH PROTECTION AGAINST DEMAGNETIZATION OF LOW FLUX PORTION OF PERMANENT MAGNET POLES

This invention relates to permanent magnet rotary dynamo electric machines of the kind wherein relative rotation occurs between a plurality of permanent magnet poles, and a plurality of wound poles, the wound poles being wound in the sense that they have associated therewith electric current carrying conductors. Thus the term permanent magnet rotary dynamo electric machine is intended to include direct current (d.c.) and alternating current (a.c.) machines, both motors and generators, both those wherein the permanent magnet poles are carried by a rotor which rotates within or around a wound stator, and the more usual arrangement wherein the permanent magnet poles form part of the machine stator and a wound armature rotates within the confines thereof.

In such permanent magnet machine there is of course an air gap between the rotor and the stator, and the magnetic field of each permanent magnet pole coacts in use with the magnetic field of the wound poles movable relative thereto, the field of the wound poles being generated by electric current flowing in the associated winding conductor. In a motor the current flow generates the relative movement between the stator and the rotor whereas in a generator relative motion between the rotor and the stator generates the current flow. The interaction of the two magnetic fields gives rise to a well understood phenomenon known as "armature reaction". The effect of armature reaction is to increase the magnetic flux density towards one tip of the permanent magnet pole at the expense of decreasing the flux density towards the opposite tip of the permanent magnet pole. The tips of the permanent magnet poles referred to in the preceding sentence are the opposite end regions of the pole in relation to the direction of relative rotation of the rotor and stator and are normally referred to as the leading and trailing tips respectively of the pole. However, armature reaction in a d.c. motor increases the flux density towards the leading tip, whereas in an equivalent generator the flux density is increased towards the trailing tip. Since the present application is concerned with both generators and motors it is more convenient to refer to the permanent magnet poles as having, as a result of armature reaction, a strong tip (the end region of the permanent magnet pole at which the armature reaction gives rise to an increased flux density) and a weak tip (the end region of the permanent magnet pole at which armature reaction gives rise to a decreased flux density).

The effect, on permanent magnet material, of an excessive reduction in flux density is to demagnetize the material. However, since the effects of armature reaction are well known permanent magnet dynamo electric machines are so designed that in normal operation the decrease in flux density at the weak tip of each of the permanent magnet poles is insufficient to cause demagnetization of the weak tips. There are a number of known design techniques to increase the resistance to demagnetization, for example increasing the radical thickness of a permanent magnet pole increases its resistance to demagnetization as does reducing the circumferential arc of the pole. However, these known techniques entail disadvantages in other areas such as increased machine size and weight, and decreased operating efficiency, and thus machine design is generally a compromise in which no demagnetization will occur during normal operating conditions of the machine. It will be understood that the degree of reduction in flux density at the weak tips of the permanent magnet poles in a machine will be determined inter alia by the current flow in the conductors of the wound poles. Thus taking as an example a d.c. permanent magnet motor designed for use as an internal combustion engine starter motor, then the design of the motor will be such that when used normally, with a predetermined electric storage battery as its power source, the power output of the motor will be sufficient to perform the required function, and the permanent magnet poles will be designed to withstand, without demagnetization, the maximum lock current which can flow in the windings of the wound poles when energising the starter motor from rest using the intended electric storage battery. Thus during normal usage there will be no problem. However, should the motor be supplied from a nonstandard battery, as can occur when the engine is being started using a jump-lead connection from another vehicle or from an auxiliary battery, then the lock current flowing in the conductors of the wound poles of the armature may exceed the design limit so that demagnetization of the weak tips of the permanent magnet poles of the machine occurs. Thereafter of course the machine will not operate efficiently, in that for example it may not provide a sufficient cranking speed to start the associated engine and indeed may not operate at all, until the poles have been remagnetized.

To design a permanent magnet machine with a safety factor sufficient to accommodate such situations, using existing technology, would result in a less economic product. Similar problems can occur in a generator wherein a fault in the output control circuit may give rise to an uncontrolled transient current rise in a winding to an extent sufficient to cause demagnetization of the permanent magnet pole weak tips.

It is an object of the present invention to provide permanent magnet rotary dynamo electric machines wherein the resistance to demagnetization of the weak tips of the permanent magnet poles is increased without significant increase in the aforementioned disadvantages.

According to a first aspect of the present invention, in a permanent magnet dynamo electric machine wherein the rotor is always intended to rotate in the same direction relative to the stator, each permanent magnet pole is provided on that face which is presented to the air gap with a shield of material of high saturation flux density, said shield extending circumferentially of the machine from the edge, or from adjacent the edge, of the weak tip towards the strong tip and covering not less than 20% and not more than 75% of that area of said face of the pole which is swept by the wound poles during relative rotation of the permanent magnet poles and the wound poles, said shield at least at or adjacent its weak end, covering the whole axial dimension of said swept area and terminating, in the circumferential direction, short of the edge of the strong tip.

Preferably said shield covers not less than 40% and not more than 50% of said swept area.

Conveniently where the swept area of the permanent magnet pole is not the total area of said face by virtue of one or both of the opposite axial ends of the permanent magnet pole projecting beyond the axial extent of the wound poles, then the shield is extended axially onto the non-swept area.

The effect of the shield is to distribute the flux in the covered region of the permanent magnet pole evenly throughout the covered region. Thus the greatly reduced flux density adjacent the extreme edge of the weak tip is augmented by flux distributed by the shield from the region of the pole nearer the strong tip, thus averaging the flux density in the area of the pole covered by the shield. It might be thought therefore that greater benefits would be obtained by extending the shield to cover the whole of the pole face. This however is not the case and it is crucial that the coverage does not exceed 75% in the swept area of each pole face since the shield, in averaging the flux density of the covered region of the permanent magnet pole, increases the air gap flux density in the strong tip region of the air gap. This effect is without significant disadvantage provided that the 75% coverage is not exceeded. However, if coverage is extended to the strong tip the increase in air gap flux density in the strong tip region of the air gap becomes so extreme as to give rise to unacceptably high losses resulting from a combination of losses through saturation of the wound poles, and pole face losses both at the wound pole faces and at the permanent magnet pole faces. Since pole face losses can be considered to be proportional to the square of the flux density it will be recognised that since the shield is restricted to regions of relatively low flux density, lower pole face losses are entailed than would be the case if coverage of the strong tips occurred.

An advantage of certain permanent magnet machines is that their direction of rotation is reversible with only minor modifications to ancillary equipment. Thus there is a class of machines known as reversible machines which are arranged so that their direction of rotation can be changed at will during their use. The above-defined principle of permanent magnet pole "weak tip shielding" can be applied to reversible machines but it will be recognised that since a change in the direction of rotation changes a weak tip into a strong tip and vice versa then the design of a machine with "weak tip shields" which can accommodate rotation in either direction, entails additional problems. As either tip of each permanent magnet pole can become the weak tip then each tip must be provided with a shield. Thus for each direction of rotation each pole will have a weak tip shield and a strong tip shield. We have explained above why it is crucial not to extend the weak tip shield to cover the strong tip since unacceptable losses will occur. Nevertheless we have determined that in the situation where the reversability of the machine is the primary desideratum then acceptable results can be obtained for each direction of rotation notwithstanding the presence of a strong tip shield, provided that the two shields are maintained substantially magnetically separate, that is to say are not joined in the sense of being a single shield, and so do not average the flux density over the whole of the pole face. The magnetically separate nature of the two shields ensures that the weak tip shield averages the flux in the weak tip end of the pole and provides the desired demagnetization protection. The averaging of the flux in the strong tip end of the pole entails only acceptable losses. The overall result therefore can be a machine having the desired reversibility with enhanced resistance to weak tip demagnetization, and with acceptable losses, although the overall efficiency of the reversible machine for a given direction of rotation will not be as high as would be the case for an equivalent single direction of rotation machine provided with weak tip shields.

Thus in accordance with a second aspect of the present invention in a reversible, permanent magnet, dynamo electric machine each permanent magnet pole is provided on that face which is presented to the air gap with first and second shields of material of high saturation flux density, said first shield extending circumferentially of the machine from the edge, or from adjacent the edge, of one of the circumferential tips of the pole towards the axial centreline of the pole, and the second shield extending circumferentially of the machine from the edge, or from adjacent the edge, of the other circumferential tip of the pole towards the axial centreline of the pole, both of said first and second shields covering, at and adjacent its weak end, the whole axial dimension of that area of the pole which is swept by the wound poles during relative rotation of the permanent magnet poles and the wound poles, and, said shields being magnetically separate.

Preferably said first and second shields each cover not less than 20% and not more than 45% of said swept area.

Desirably said first and second shields are physically separate components independently secured in position on said face.

Alternatively said shields are interconnected by a bridging member so as to define a unitary structure, said bridging member providing the necessary magnetic discontinuity between the shields.

Preferably the or each shield is of plate-like form.

Desirably the or each shield is of flat plate-like form.

Conveniently the material of the or each shield is mild steel.

Alternatively the material of the or each shield is a low loss material for example, silicon-iron alloy, amorphous glassy metal, or high electrical resistance sintered iron powder.

Desirably the or each shield is laminated with the laminations extending circumferentially of the machine.

Desirably the or each shield is set in a recess in said pole face so that the machine air gap is substantially constant.

Alternatively the or each shield is seated on the pole face so as to project radially into the machine air gap.

It has been determined that the radial thickness of the or each shield is of significance and thus preferably the thickness of the or each shield is not less than 2% and not greater than 25% of the overall radial dimension of the combined pole and shield(s).

Preferably the shield thickness is in the range 5-15% of the overall radial dimension of the combined pole and shield(s).

Conveniently all of said shields are parts of a common unitary shield member.

Desirably said unitary shield member effects, or assists in, securing said permanent magnet poles to the pole carrying component of the machine.

Preferably the permanent magnet poles of the machine are formed from ferrite material.

One example of the invention is illustrated in the accompanying drawings wherein.

Figure 1:
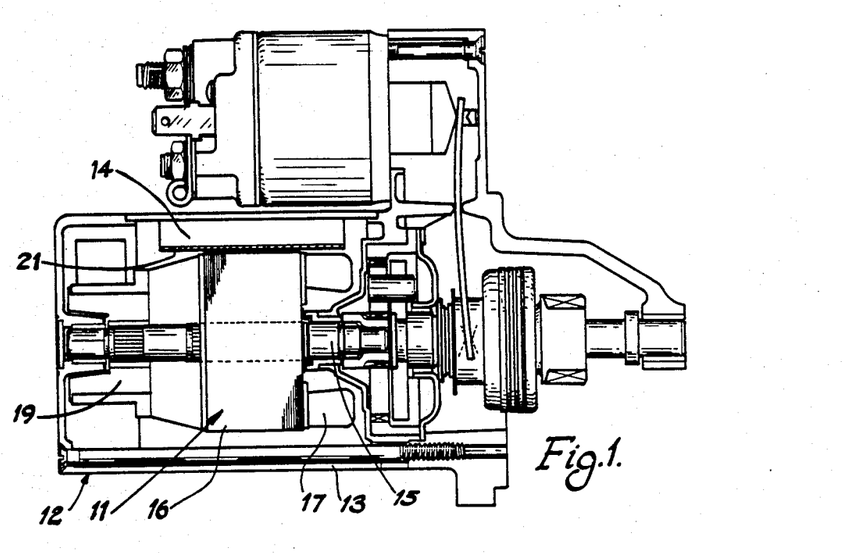
FIG. 1 is an axial cross-sectional view of a d.c. permanent magnet internal combustion engine starter motor with a wound rotor.
Figure 2:
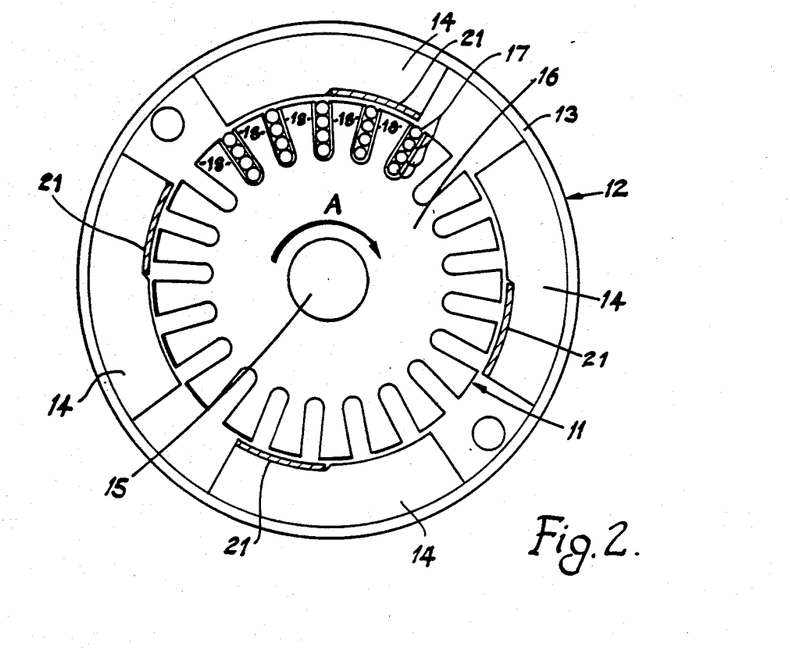
FIG. 2 is a transverse cross-sectional view to an enlarged scale of part of the motor shown in FIG. 1.

Referring first to FIGS. 1 and 2 of the drawings, it can be seen that the permanent magnet d.c. motor has a rotor 11 and a stator 12. The stator 12 includes a hollow cylindrical mild steel yoke 13 carrying four arcuate permanent magnet poles 14 equi-angularly spaced around its inner surface. The yoke 12 carries, at its opposite axial ends, bearings for the shaft 15 of the rotor 11 and on the shaft 15 the rotor 11 has a wound, laminated core 16 of conventional form. The core 16 rotates within the cylindrical volume bounded in part by the inner, part-cylindrical faces of the poles 14, there being an air gap between the outer surface of the core 16 and the radially innermost faces of the poles 14.

As is conventional, the core 16 has a plurality of equi-angularly spaced axially extending slots (see FIG. 2) within which are housed the rotor winding conductors 17. The material of the core 16 between the slots defines wound poles 18 of the rotor. The shaft 15 carries a commutator 19 to which the rotor winding conductors 17 are electrically connected in known manner. When current flows in the winding 17 the rotor 11 is caused to rotate.

The poles 14 are formed from permanent magnet material could be utilized. Each pole 14 is in the form of a segment of a cylinder, and the poles 14 are positioned with their cylindrical axes coincident and coextensive with the axis of the yoke 13 and the axis of the shaft 15. Thus with particular reference to FIG. 2 it can be seen that the direction of rotation of the rotor 11 is defined by arrow A as clockwise rotation and thus the counter-clockwise circumferential half of each of the poles 14 can be considered to be the leading tip of the pole while the clockwise circumferential half of each pole can be considered to be the trailing tip. Since the machine is a d.c. motor it will be recognized that when current flows in the winding 17 armature reaction will occur and the effect of the armature reaction will be to concentrate flux density in the leading tip of each pole and to reduce flux density in the trailing tip of each pole. Thus in the example illustrated in FIGS. 1 and 2 the leading tip of each pole is the strong tip and the trailing tip of each pole 14 is the weak tip.

It is known that if the current flow in the winding 17 exceeds the design limit then the weakening of the flux density at the weak tip of each of the permanent magnet poles can be sufficient to cause permanent demagnetization of part or all of the weak tips.

In order to increase the resistance to demagnetization, (and thus increase the extent by which the design limit current can be exceeded without causing demagnetization) each of the poles 14 is provided with a shield 21. The configuration of each pole and its respective shield 21 is the same, and thus only one will be described. The shield 21 is a plate of rectangular shape bent to conform to the curve of the pole 14 and of a material having high saturation flux density, in this example, mild steel. In choosing the permanent magnet material of the poles 14 and the material of the shields 21 it should be borne in mind that desirably there should be a good "contrast" between the materials in that the pole material should have a relatively low saturation flux density, particularly in a direction at right angles to the direction of magnetisation, in relation to a relatively high saturation flux density of the material of the shields. The choice of ferrite materials for the poles 14 and mild steel for the shields achieves this good saturation flux density "contrast". However the choice of materials should be made bearing in mind the possibility of new developments in permanent magnet materials for example the production of a new material having the desirable properties of the well known ALNICO magnets (i.e. high remanence) without the attendant "Metallic" disadvantages of ALNICO magnets (i.e. high saturation flux density).

The length of one side of the rectangular plate to the axial length of the pole 14, and the length of the adjacent side of the plate is less than the arcuate length of the pole. The concave face (as presented to the air gap) of the pole is cut away to accept the plate, so that the air gap between the pole and the rotor remains substantially constant. The plate extends circumferentially of the pole face from the extreme edge of the trailing (weak) tip towards the leading (strong) tip, and thus constitutes the shield 21 covering the weak tip. The effect of the plate 21 which, by virtue of being mild steel, has high permeability, is to redistribute the flux density in the part of the pole which is covered by the shield 21. The redistribution averages the flux density over the covered part of the pole and thus augments the weakest density towards the extreme end of the weakest tip and so increases the resistance to demagnetization.

It is important that the shield 21 does not extend over the whole of the pole face, since extending the shield 21 to cover the strong tip of the pole would introduce losses in the machine sufficient drastically to reduce its overall efficiency. Tests have indicated that within that area of the pole which is swept by the wound poles of the rotor 16 no less than 20%, and no more than 75% should be covered by the shield 21. References to the area of the pole swept by the wound poles 18 of the rotor 11 can readily be understood with reference to FIG. 1 where it can be seen that the poles 14 project at both axial ends beyond the axial extend of the rotor core 16. Thus there is an area at both axial ends of each pole which is not swept by the poles 18. Another way of stating the same criteria would be to refer to the area of each pole which lies in the shadow of the rotor core. Clearly it is the area of the pole which is swept by the wound poles 18 which is of concern when considering demagnetization effects. It can be seen in FIG. 1 that each shield 21 includes an extension onto those axial regions of the pole which are not swept by the wound poles 18. These extensions are not considered in the calculation of "not less than 20% and not greater than 75% coverage". With particular reference to a d.c. motor used as an internal combustion engine starter motor it has been determined that the percentage coverage by the shield 21 within the swept area should for best results lie between 40 and 50% and it is believed that the optimum will be in the region of 45%. However, other factors influence the calculation of the optimum coverage, and it is to be noted that none of the drawings are to be taken to indicate a strictly accurate mathematical calculation of the percentage coverage.

The thickness of the shield 21 in relation to the radial thickness of the pole 14 is also a factor which determines the efficiency of the shield in increasing resistance to demagnetization. Tests have indicated that preferably the thickness of a mild steel shield used on a ferrite magnet (the combination described above) is from 2% to 25% of the overall thickness of the pole plus shield combination, with the preferred range for the starter motor of FIGS. 1 and 2 being from 5% to 15%, the machine air gap being from 0.5 to 2.0 mm.

The shield 21 is secured to the pole 14 in any convenient manner, for example by the use of an adhesive. Similarly the poles 14 are secured to the yoke 13 by a suitable adhesive. It is to be recognized, however, that it would be possible to provide the shield 21 with one or more lugs at each axial end thereof, the lugs projecting beyond the axial ends of the associated pole, and receiving nonmagnetic rivets (aluminum or an equivalent) which pass also through the yoke. Thus the rivets would serve to secure the shield tightly against the permanent magnet pole, and at the same time would serve to trap the permanent magnet pole tightly against the yoke.

Given the basic concept of using a shield at the weak tip to average the flux in the weak tip, and thereby increase the resistance to demagnetization it will be recognised that there are a multitude of variations which can be employed. Inevitably there will be variations dependent upon the design of the machine, since the use of a "weak tip shield" is applicable not only to d.c. permanent magnet motors, but also to generators, and a.c. synchronous machines.

Figure 3:
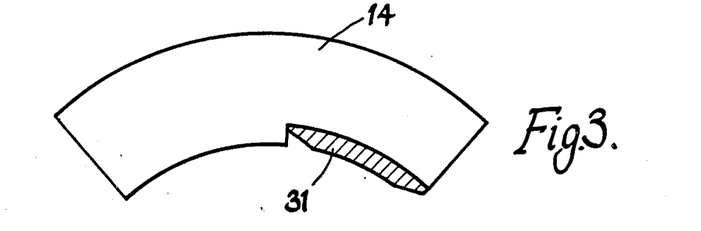
FIGS. 3 and 4 are respectively transverse cross-sectional views of permanent magnet poles illustrating modifications of the arrangement illustrated in FIGS. 1 and 2.

FIGS. 3, 4, 5, 6, 7 and 10 illustrate possible modifications. FIG. 3 illustrates a permanent magnet pole 14 wherein the shield 31 is of tapering thickness at its weak and strong ends, the greatest thickness being over the central region of the shield the thickness tapering to a minimum at both ends. The theory underlying the use of a shield 31 as shown in FIG. 3 is that when used in a d.c. motor the weak tip is the trailing tip, and it is known that magnetic saturation will not be so great at the extreme trailing edge, as it is further back towards the leading edge of the magnet. Thus it is not essential to provide the full shield thickness in this area. In an arrangement as shown, where the shield is set in a recess of constant depth then the reduced thickness at the weak tip end of the shield increases the air gap between the pole and the rotor and thus minimizes the magnetic flux circulating from pole to pole of the rotor. Tapering the thickness from the central region towards the stronger edge of the shield prevents a sudden change in flux density at the point where the shield terminates.

Figure 5:
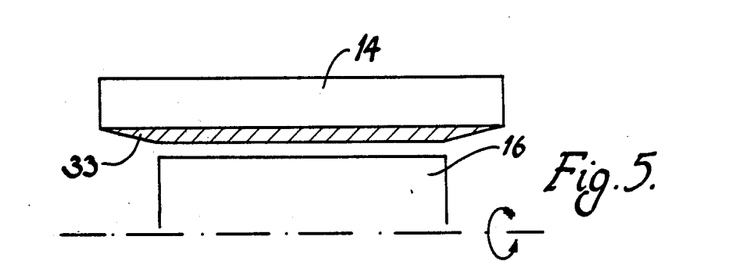
FIG. 5 is an axial cross-sectional view of a pole illustrating a further modification of the arrangement illustrated in the previous drawings.

In the arrangement illustrated in FIG. 5, the axial edges of the shield 33 which overlie the unswept axial margins of the pole 14 taper in thickness substantially to zero at the actual axial ends of the pole. The presence of extensions on the unswept margins enhances the flow of flux between the axial ends of the magnet poles and the effect reduces towards the extreme axial ends of the poles 14 and thus there is no advantage in retaining full shield thickness in these regions. The reduction in thickness reduces the machine weight and cost. A further reduction could be achieved in some applications by removing the tapered axial ends so that the shield terminates short of the axial ends of the pole.

Figure 6:
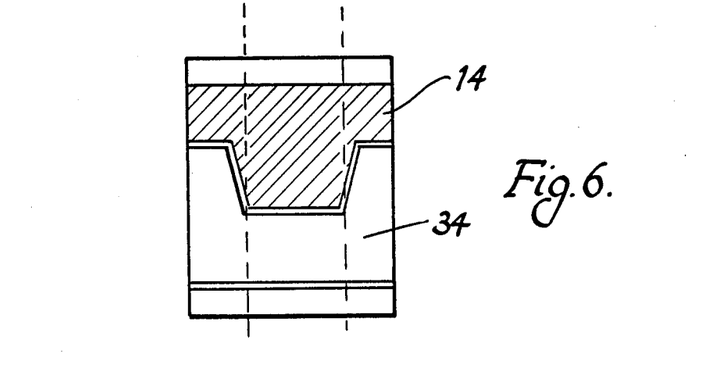
FIG. 6 is a plan view of a permanent magnet pole illustrating a still further modification.

FIG. 6 illustrates a shield 34 wherein those portions of the shield which cover the unswept axial margins of the pole are extended circumferentially of the pole by comparison with the center portion of the shield which covers part of the swept area of the pole 14. In FIG. 6 the swept area is that area lying between the dotted lines. The extension of the coverage towards the strong tip of the pole, in those regions where the pole overhangs the core is beneficial in that it assists in the channelling flux from the axial ends of the pole 14 into the axial ends of the core 16 over a wider arc. It would be possible for the axial extensions to cover the full circumferential arc of the pole 14 provided that these extensions do not encroach onto the swept area of the strong tip.

The presence of a shield of material of high saturation flux density on the pole face may tend to increase pole face losses in the machine, thus decreasing the efficiency of the machine. The tendency towards pole face losses is not greatly significant, provided that the shield does not extend into the regions of high flux density (pole face losses being proportional to the square of the flux density). However, the pole face losses introduced as a result of the provision of the shield can be minimised in a number of ways. Firstly, the shield could be of laminated construction, each lamination being equal in width to the thickness of the shield, and extending circumferentially of the pole that is to say from the weak tip towards the strong tip. It will be recognised that the laminated construction of a shield would be of benefit, since pole face losses are primarily eddy current losses and eddy current circulation would be resisted by the laminated construction of the shield. A similar effect could be achieved by constructing the shield from a plurality of strands of iron wire, the strands extending from the weak tip towards the strong tip.

Figure 4:
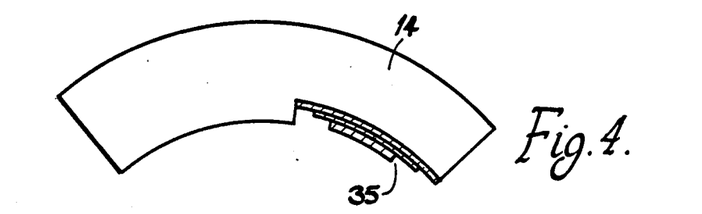

FIG. 4 illustrates a construction wherein the tapering effect of FIG. 3, and a certain degree of resistance to pole face losses can be achieved. In the FIG. 4 construction the thickness of the shield 35 is defined by a plurality of very thin plates of different circumferential, and if necessary axial, length. It can be seen that the tapering effect of the shield 35 tapers from a maximum at the centre to a minimum both at the weak end of the shield and at the strong end of the shield.

Further savings in pole face losses may well be obtained by using low loss materials in the construction of the shield, rather than mild steel. It would appear that low loss materials such as silicon-iron alloy, amorphous ribbon glassy metal, and high electrical resistance sintered iron powder may well prove useful in the construction of weak tip shields. The term "high saturation flux density" is a relative term, but will be understood in the art. Preferably materials having a saturation flux density of 10,000 gauss and above will be used.

Figure 7:
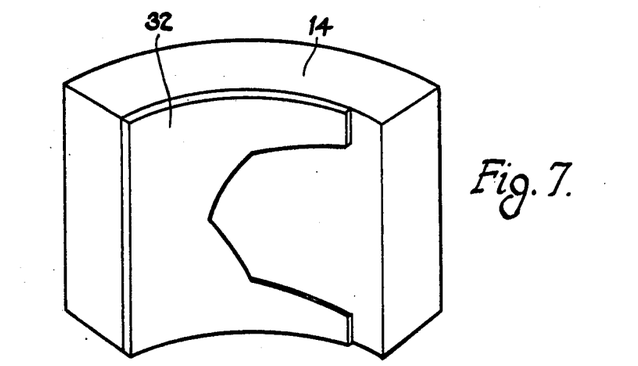
FIG. 7 is a perspective view of an alternative to the FIG. 6 construction.

The construction illustrated in FIG. 7 has a chevron shaped cut-out at the strong end of the shield 32 (the pole illustrated in FIG. 7 having its weak end at the opposite circumferential end to the poles illustrated in the other views). Such a construction would, it is believed, help to balance the magnetic forces acting on the rotor and so assist in reduction of "cogging".

Figure 10:
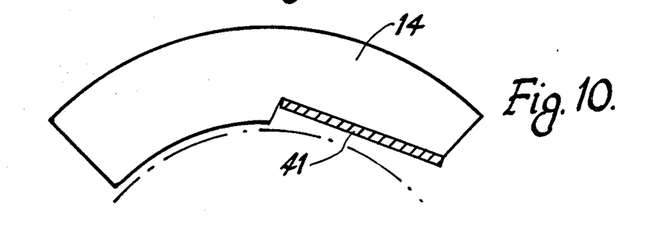
FIG. 10 is a view similar to FIGS. 3 and 4 of a further modification and FIGS. 11 and 12 are respectively a perspective view and an end view of parts of a still further alternative shield arrangement.

The construction shown in FIG. 10 illustrates an arrangement which may be more simple to manufacture. The shield 41 is in the form of a flat plate of mild steel rather than an arcuate construction as in the other constructions. The flat shield 41 is engaged with a corresponding flat surface on the pole 14 it being believed that a flat pole surface may be easier to achieve than a curved pole surface for engagement by the shield. The flat plate shield 41 of FIG. 10 of course produces a tapering air gap between the flat shield and the cylindrical armature. The nature of the taper will be chosen to suit the desired operating characteristics but as shown in FIG. 10 an arrangement where the air gap is greater adjacent the pole tip than at the centre of the shield and the minimum air gap is at approximately two thirds of the length of the shield from the weak tip of the pole, is thought to be suitable for a d.c. permanent magnet motor. In addition to the simplification of the manufacturing process, the flat shield affords the advantage of "grading" the air gap along the shield length to give a larger air gap at the weak tip end thus minimising losses arising from circulation of flux in the shield, and also minimising "cogging".

There are further modifications which can in theory be made to the assembly in conjunction with the use of weak tip shields to further enhance the resistance to demagnetization. Thus a general reduction in the thickness of the material used to form the yoke would enhance the resistance to demagnetization. However, rather than a general reduction in thickness it would be preferable to reduce the thickness locally over an axially extending region aligned radially with the central area of each pole. Reducing the thickness of the yoke in this manner is possible since the weak tip shield diverts flux from the usual flux path including the permanent magnet and the yoke and thus in addition to enhancing the resistance to demagnetization of the permanent magnet, the shield decreases the risk of magnetic saturation of the yoke. Since the risk of saturation of the yoke is reduced, a consequent reduction in the thickness of the yoke material is acceptable. The localized thinning of the yoke on the centreline of each pole, or even a complete removal of yoke metal at that point, would enhance the resistance to demagnetization of the weak tips of the poles by restricting the flow of demagnetizing flux.

In each of the examples described above the shield is inset into the pole face. It is to be recognized however that it would be possible to dispense with the need to modify the permanent magnet pole faces by securing the shield onto the pole face so that the shield lies in the air gap between the pole face and the rotor core.

A combination of inset and surface fitting of the shield can be utilized where appropriate, thus giving a variation in the air gap at different points on the pole arc. Moreover, in the construction shown in FIG. 7 it can be seen that shield 32 is surface fitted but that the pole thickness tapers from a maximum at the strong end to a minimum at the weak end. This arrangement may be considered as a good compromise in that the air gap at the pole weak end is not reduced (or is even increased) by comparison with a non-shield machine, and the pole does not require a recess in its face which may prove difficult and costly to provide.

Figure 8:
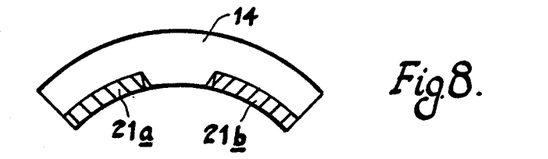
FIG. 8 is a transverse cross-sectional view of a permanent magnet pole arranged for use in a reversible d.c. motor.
Figure 9:
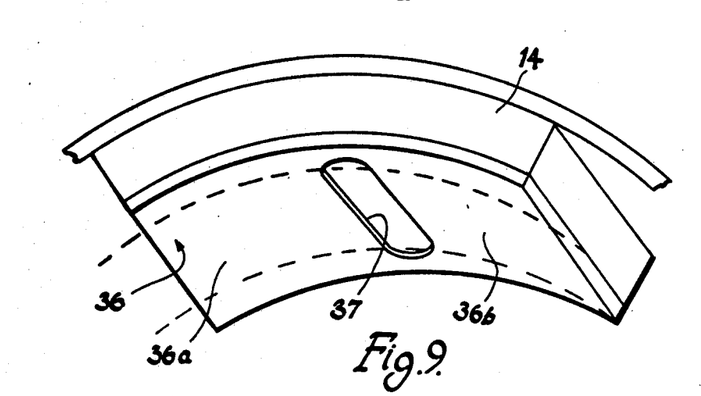
FIG. 9 is a perspective representation of a further alternative pole construction for use in a reversible d.c. motor

The construction illustrated in FIGS. 1 and 2, and the aforementioned possible modifications described with reference to FIGS. 3 to 7 and 10 relate to a d.c. machine wherein the rotor is intended to rotate always in the same direction relative to the permanent magnet stator of the machine. It is to be understood, however, that there is a class of permanent magnet machines wherein it is intended that the direction of rotation of the rotor may be reversed. Using a d.c. permanent magnet motor as an example, it is well understood that only minor changes in ancilliary equipment are required to reverse the rotation of the rotor, the basic requirement of course being reversal of the current flow in the windings of the rotor. Thus there is a class of machine wherein reversability is a desired feature. When considering the provision of weak tip shields there is a difficulty insofar as reversible machines are concerned since reversal of the direction of rotation reverses the weak and strong tips of the poles. Thus the end of the pole that was the weak tip becomes the strong tip and the end of the pole which was the strong tip becomes the weak tip. In order therefore to accommodate reversability it is necessary to provide a shield a both circumferential ends of the pole. FIGS. 8 and 9 illustrate two arrangements whereby this may be achieved. It will be recognised that for each direction of rotation each permanent magnet pole 14 will have one of the shields constituting a weak tip shield, and the other shield constituting a strong tip shield. The use of a strong tip shield is not particularly desirable, but it is found that provided the two shields are magnetically separate then the disadvantageous effects of providing a shield at the strong tip may well be acceptable in the light of the need to produce a reversible machine. It is evident therefore that each of the two shields (21a and 21b in FIG. 8) will extend from the extreme circumferential edge towards the axial centreline of the pole. In the FIG. 8 version the two shields are totally separate from one another and are individually secured to the pole 14 there being an area of the pole 14 protruding between the two shields. Thus there is a magnetic discontinuity between the two shields and the two shields thus do not act as a single shield averaging the flux density over the whole of the pole. As long as the discontinuity between the two shields is maintained the disadvantageous effects of shielding the strong tip can be tolerated.

FIG. 9 illustrates a construction wherein the pole 14 carries a single plate 36 defining both shields 36a and 36b. The swept region of the pole is indicated between the dotted lines in FIG. 11, and it can be seen that insofar as the swept region is concerned the shields 36a and 36b are magnetically discontinuous since the plate 36 is formed with a centrally disposed aperture 37. Thus the two shields 36a, 36b are physically interconnected only in those regions where the shield overlies unswept areas of the pole 14. Again, while in theory such a construction is satisfactory care must be taken to ensure that the interconnecting webs, even though they overlie unswept regions, are not sufficiently large as to provide a significant magnetic connection between the shields.

Where two separate plates are used they can be physically interconnected while preserving the magnetic discontinuity by means of a bridging member formed from aluminium or some equivalent suitable material.

Considering the two shields of each pole of a reversible machine as separate entities it is believed that insofar as the swept area of each pole is concerned then each shield should cover not less than 20% of the swept pole area starting from the extreme end and not greater than 45% of the swept area. It will be understood that the various modifications and alternatives described above in relation to single direction of rotation machines can be applied, where appropriate, to the shields used in a reversible machine.

In the examples described above the permanent magnet poles are fixed and the wound poles move. It is to be understood that the concept of weak tip shielding can be similarly applied to machines wherein the stator has the wound poles and the permanent magnet poles are parts of the rotor of the machine. This is found in a.c. machines wherein the rotor may surround the stator as opposed to being within the stator.

It will be apparent to the expert in the art that there are many variables in the choice of design parameter of the machine intended for a particular application. Thus the designer will reach a compromise between cost, efficiency and ease of manufacture which will influence his choice of shield material and thickness, pole material and thickness, pole arc and shield arc, shield axial extent, shield shaping, and so on. Moreover in some instances it may prove to be possible to achieve the advantages of weak tip shielding using a shield which commences close to but not covering the extreme edge of the weak tip. However for most applications the shield will commences at the extreme edge of the permanent magnet pole weak tip.

The use of the weak tip shields described above affords additional advantages. For example, in a machine having brushes and a commutator the provision of a pole shield can have beneficial effects on commutation by helping to control the flux in the interpolar space (that is to say the circumferential space between the permanent magnet poles). By comparison with an equivalent machine not equipped with shields, the provision of the shield effects a reduction both in the overall flux in the interpolar spaces, and the variability of the flux during operation of the machine. In a region of the interpolar space known as the commutation zone (that is to say that part of the interpolar space which is aligned with the armature conductors which are connected to the brushes by way of the commutator segments), desirably there should be a low value of flux density in order to prevent voltage being generated across the brush. It will be recognised that voltage generated across the brush will cause a circulating current in the winding which is short circuited by the brush. Ideally the flux density in the commutation zone should be opposite to that generated by armature reaction during use of the machine and should be in proportion to the current being carried by the brushes so as to help to reverse the current flowing in the winding which is undergoing commutation. In a permanent magnet machine equipped with ferrite poles the high reluctance of the ferrite material causes a greater variation of flux density in the commutation zone than is conventionally obtained with wound field machines. Thus an arrangement which minimizes, in a ferrite permanent magnet machine, the overall value of flux density and the variation in flux density in the commutation zone is advantageous. The provision of a steel weak tip pole shield effects a reduction in the level of flux density and the variation of flux density within the commutation zone and thus achieves a change in the operating characteristics of the ferrite permanent magnet machine to approximate to that of a wound field machine of comparable performance.

A further advantage is that the shield will provide additional protection against the undesirable effect of transient currents. Where the inductance of the machine armature is low then in a transient voltage situation, for example at the point of switching on the machine, there will be a very rapid increase in the current in the armature windings to a value which significantly exceeds the current in the windings during steady state operation. At the point in time where the rapid current rise occurs, the inertia of the armature resists rotation of the armature, and thus virtually no rotation will have occured by the time the peak current has been achieved, and naturally therefore there will be no back EMF generated in the armature windings to effect a reduction in the current. It follows therefore that in such transient conditions in a permanent magnet machine which is not equipped with weak tip shields, there is a danger that the effect of the peak current in the transient condition will cause demagnetisation of the permanent magnet poles. However, the provision of a shield formed from electrically conductive material greatly minimises the risk of demagnetization since the shield will itself carry current which will oppose the demagnetizing effect of the peak current flowing in the armature conductors beneath the pole weak tip. The effect of the opposing current flowing in the shield is to delay the collapse of flux in the weak tip of the pole and thus permit additional time for the armature to start to rotate and so generate the back EMF opposing the transient current in the winding. Clearly, if the armature is for some reason locked against rotation then the shield has little overall benefit in protecting against transient high currents, but in most cases the armature will not be locked against rotation and thus rotation of the armature will occur sufficiently quickly for the protection afforded by the shield in transient conditions to be effective.

It will be recognized that throughout the foregoing description where a pole has a single shield, the shields of the poles are separate from one another. Similarly, in an arrangement where a pole has a pair of shields, to facilitate use in a reversible machine, then the shields of each pole may be separate components, or maybe parts of a single component specific to a respective pole. It is to be understood however that if desired the or each shield of each pole could be part of a unitary shield component in the form, for example, of a hoop of mild steel. In such an arrangement, the hoop would be secured to the component which supports the poles at a single point, or in the event that the hoop does not have its ends joined then it could be secured to the component which carries the poles at two points. Moreover, the hoop could be utilized, by virtue of its connection to the component carrying the poles, and its engagement through the shields with the permanent magnet poles, to effect, or aid, the securing of the poles in position on the pole carrying component. It will be recognised, however, that the amount of material between the shields and the component carrying the poles must have a flux carrying capacity which is very small, so as to avoid the possibility of shunting flux from the air gap directly to the pole carrying component (for example the yoke of the machine). A convenient construction can be formed from mild steel strip of length equal to the air gap circumference of the machine. The strip is stamped to provide rectangular apertures which define between them the shield or shields for each pole. The shaping of the apertures can be such as to define small tags attached to the shields, and the parts joining shields, which can be bent up to engage the side faces of the poles to provide location. The strip is bent to cylindrical form and its ends are joined in any convenient manner. In assembling the machine, the poles can be engaged with the shields of the cylinder, being located by the tags (which extend radially outwardly) and the cylinder and poles then being slid into the machine yoke. The poles can be secured to the yoke if necessary, the hoop can be located and secured by engagement with the machine end caps (known as end brackets) or by engagement with the through bolts of the machine which interconnect the end caps and secure them to the yoke.

Figure 11:
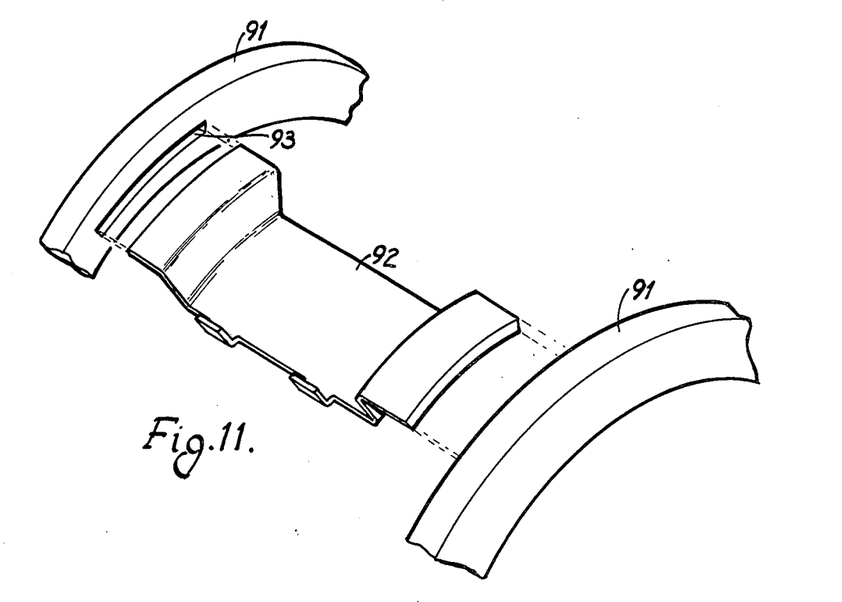
Figure 12:
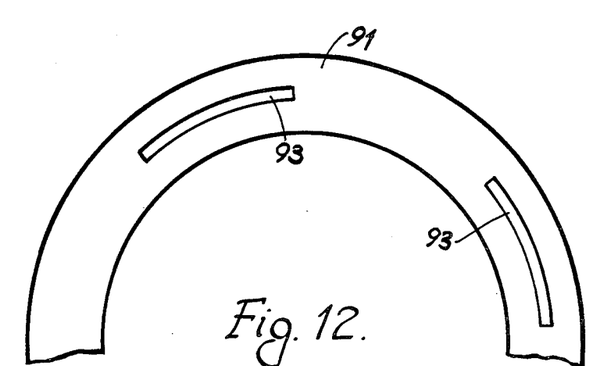

FIGS. 11 and 12 show a further alternative in which the shields are held by parallel die cast, non-magnetic metal, or moulded synthetic resin rings 91. The rings 91 could be secured to the end caps of the machine or to the through bolts. Alternatively the rings 91 could be integral parts of the end caps or other non-magnetic parts of the machine structure. For example, one of the rings could be integral with the moulded brush box assembly of the machine. Where separate rings 91 are used (as shown), the shields 92 could slot into recess 93 in the rings or the rings could be moulded around the ends of the shields. However, where the rings are integral with the end caps, there will need to be a slot-in engagement between the shields and at least one of the end caps. As with the previous example, the shields can have integral pole locating tags.

I claim:

1. A permanent magnet dynamo electric machine of the kind wherein the rotor is always intended to rotate in the same direction relative to the stator, and wherein each permanent magnet pole is provided on that face which is presented to the air gap defined between the permanent magnet poles and the wound poles with a shield of material of high saturation flux density, said shield extending circumferentially of the machine from the edge, or from adjacent the edge, of the weak tip of the pole towards the strong tip and covering not less than 20% and not more than 75% of that area of said face of the pole which is swept by the wound poles during relative rotation of the permanent magnet poles and the wound poles, said shield at its weak end, covering the whole axial dimension of said swept area and terminating, in the circumferential direction, short of the edge of the strong tip of the pole, wherein said shield is set in a recess in the pole face so that the radial thickness of the machine air gap is substantially constant, and wherein the thickness of the shield is in the range of 5-15% of the overall radial dimension of the combined pole and shield.

2. A machine as claimed in claim 1 wherein said shield covers not less than 40% and not more than 50% of said swept area.

3. A machine as claimed in claim 1 wherein the swept area of the permanent magnet pole is not the total area of said face by virtue of one or both of the opposite axial ends of the permanent magnet pole projecting beyond the axial extent of the wound poles, and wherein the shield is extended axially onto the non-swept area.

4. A reversible, permanent magnet, dynamo electric machine wherein each permanent magnet pole is provided on that face which is presented to the air gap defined between the permanent magnet poles and the wound poles with first and second shields of material of high saturation flux density, said first shield extending circumferentially of the machine generally from the edge of one of the circumferential tips of the pole towards the axial centerline of the pole, and the second shield extending circumferentially of the machine generally from the edge of the other circumferential tip of the pole towards the axial centerline of the pole, both of said first and second shields covering, substantially at its weak end, the whole axial dimension of that area of the pole which is swept by the wound poles during relative rotation of the permanent magnet poles and the wound poles, said shields being magnetically separate, wherein said first and second shields are each set in respective recesses in said pole face so that the radial thickness of the machine air gap is substantially constant, and wherein the thickness of each shield is in the range 5-15% of the overall radial dimension of the combined pole and shield.

5. A machine as claimed in claim 4 wherein said first and second shields each cover not less than 20% and not more than 45% of said swept area.

6. A machine as claimed in claim 5 wherein said first and second shields are physically separate components independently secured in position on said face.

7. A machine as claimed in claim 5 wherein said shields are interconnected by a bridging member so as to define a unitary structure, said bridging member providing the necessary magnetic discontinuity between the shields.

8. A machine as claimed in claim 1 wherein the shield is of plate-like form.

9. A machine as claimed in claim 1 wherein the shield is of flat plate-like form.

10. A machine as claimed in claim 1 wherein the material of the shield is mild steel.

11. A machine as claimed in claim 1 wherein the material of the shield is a low loss material, for example, silicon-iron alloy, amorphous glassy metal, or high electrical resistance sintered iron powder.

12. A machine as claimed in claim 1 wherein the shield is laminated with the laminations extending circumferentially of the machine.

13. A machine as claimed in claim 1 wherein said shields are parts of a common unitary shield member.

14. A machine as claimed in claim 13 wherein said unitary shield member effects of assists in securing said poles to the pole carrying component of the machine.

15. A machine as claimed in claim 5 wherein each shield is of plate-like form.

16. A machine as claimed in claim 5, wherein each shield is of flat plate-like form.

17. A machine as claimed in claim 5 wherein the material each shield is mild steel.

18. A machine as claimed in claim 5 wherein the material of each shield is a low loss material for example, silicon-iron alloy, amorphous glassy metal, or high electrical resistance sintered iron powder.

19. A machine as claimed in claim 5 wherein each shield is laminated with the laminations extending circumferentially of the machine.

20. A machine as claimed in claim 5 wherein said shields are parts of a common unitary shield member.

21. A machine as claimed in claim 20 wherein said unitary shield member effects or assists in securing said poles to the pole carrying component of the machine.

22. A machine as claimed in claim 1 wherein the permanent magnet poles are formed from ferrite material.

23. A machine as claimed in claim 5 wherein the permanent magnet poles are formed from ferrite material.

* * * * *